(12) United States Patent
Sun et al.

(10) Patent No.: US 12,501,413 B2
(45) Date of Patent: Dec. 16, 2025

(54) METHODS AND APPARATUSES FOR INDICATING A SET OF RESOURCES ON A NR SIDELINK

(71) Applicant: Lenovo (Beijing) Limited, Beijing (CN)

(72) Inventors: Zhennian Sun, Beijing (CN); Xiaodong Yu, Beijing (CN); Haipeng Lei, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 360 days.

(21) Appl. No.: 18/249,119

(22) PCT Filed: Oct. 16, 2020

(86) PCT No.: PCT/CN2020/121548
§ 371 (c)(1),
(2) Date: Apr. 14, 2023

(87) PCT Pub. No.: WO2022/077448
PCT Pub. Date: Apr. 21, 2022

(65) Prior Publication Data
US 2023/0397174 A1  Dec. 7, 2023

(51) Int. Cl.
*H04W 72/0446* (2023.01)
*H04W 72/0453* (2023.01)
*H04W 72/25* (2023.01)

(52) U.S. Cl.
CPC ... *H04W 72/0446* (2013.01); *H04W 72/0453* (2013.01); *H04W 72/25* (2023.01)

(58) Field of Classification Search
CPC ............. H04W 64/00; H04W 72/0453; H04W 72/566; H04W 72/563; H04L 5/00; H04L 27/26; H04L 1/1829
See application file for complete search history.

(56) References Cited

U.S. PATENT DOCUMENTS

| | | | |
|---|---|---|---|
| 2023/0015159 A1* | 1/2023 | Ko | H04J 11/005 |
| 2023/0087401 A1* | 3/2023 | Shin | H04W 4/46 370/329 |
| 2023/0371090 A1* | 11/2023 | Miao | H04W 76/14 |

FOREIGN PATENT DOCUMENTS

| | | |
|---|---|---|
| CN | 107041001 A | 8/2017 |
| CN | 107041002 A | 8/2017 |

(Continued)

OTHER PUBLICATIONS

PCT/CN2020/121548, "International Preliminary Report on Patentability", PCT Application No. PCT/CN2020/121548, Apr. 27, 2023, 5 pages.

(Continued)

*Primary Examiner* — Iqbal Zaidi
(74) *Attorney, Agent, or Firm* — FIG. 1 Patents (57) ABSTRACT

Embodiments of the present disclosure relate to methods and apparatuses for indicating a set of resources on a new radio (NR) sidelink under 3GPP (3rd Generation Partnership Project) 5G system. According to an embodiment of the present disclosure, a method includes: receiving coordination information from another UE; determining a time boundary in time domain based on the coordination information; and in response to successfully determining a set of resources in at least one domain of time and frequency domains and in response to successfully determining a resource in the time and frequency domains, transmitting, to the abovementioned another UE, signaling on the resource before the time boundary, wherein the signaling indicates the set of resources.

20 Claims, 4 Drawing Sheets

(56) References Cited

FOREIGN PATENT DOCUMENTS

| CN | 107439033 A | 12/2017 |
|---|---|---|
| EP | 3280200 A1 | 2/2018 |
| WO | 2020167031 A1 | 8/2020 |

OTHER PUBLICATIONS

PCT/CN2020/121548, "International Search Report and Written Opinion", PCT Application No. PCT/CN2020/121548, May 12, 2021, 6 pages.

20957226.2, "Extended European Search Report", European Application No. 20957226.2, May 6, 2024, 8 pages.

TCL Communication, "Feasibility and benefits for Mode 2 enhancements", 3GPP TSG RAN WG1 #102-e, R1- 2005774, e-Meeting, retrieved from the internet on May 19, 2024, <https://www.3gpp.org/ftp/tsg_ran/WG1_RL1/TSGR1_102-e/Docs>, Aug. 17, 2020, 5 pages.

2023-523158, "Foreign Office Action", JP Application No. 2023-523158, Aug. 13, 2024, 6 pages.

Fraunhofer Hhi, et al., "Resource Allocation Enhancements for Mode 2", 3GPP TSG RAN WG1 Meeting #102-e, R1-2005537, e-Meeting [retrieved May 23, 2023]. Retrieved from the Internet <https://www.3gpp.org/ftp/TSG_RAN/WG1_RL1/TSGR1_102-e/Docs>., Aug. 2020, 8 Pages.

Fujitsu, "Considerations on inter-UE coordination for mode 2 enhancements", 3GPP Draft; R1-2005546, 3rd Generation Partnership Project (3GPP), Mobile Competence Centre ; 650, Route Des Lucioles ; F-06921 Sophia-Antipolis Cedex; France, vol. RAN WG1, Aug. 2020, 11 pages.

Lenovo, et al., "Sidelink resource allocation for Reliability enhancement", 3GPP TSG RAN WG1 #102-e, R1-2005840, E-meeting, Aug. 2020, 3 pages.

Mediatek Inc., "Discussion on Mode 2 enhancements", 3GPP TSG RAN WG1 #102, R1-2005645, e-Meeting, Aug. 2020, 3 pages.

"Decision to Grant", JP Application No. 2023-523158, Dec. 4, 2024, 6 pages.

\* cited by examiner

METHODS AND APPARATUSES FOR INDICATING A SET OF RESOURCES ON A NR SIDELINK

TECHNICAL FIELD

Embodiments of the present application are related to wireless communication technology, and more particularly, related to methods and apparatuses for indicating a set of resources on a new radio (NR) sidelink.

BACKGROUND

Vehicle to everything (V2X) has been introduced into 3GPP (3rd Generation Partnership Project) 5G wireless communication technology. In terms of a channel structure of V2X communication, a direct link between two UEs is called a sidelink. A sidelink is a long-term evolution (LTE) feature introduced in 3GPP Release 12, and enables a direct communication between proximal UEs, and data does not need to go through a base station (BS) or a core network.

3GPP 5G and/or NR networks are expected to increase network throughput, coverage, and robustness and reduce latency and power consumption. With the development of 3GPP 5G and/or NR networks, various aspects need to be studied and developed to perfect the 5G and/or NR technology.

SUMMARY

Some embodiments of the present application provide a method, which may be performed by a user equipment (UE). The method includes: receiving coordination information from another UE; determining a time boundary in time domain based on the coordination information; and in response to successfully determining a set of resources in at least one domain of time and frequency domains and in response to successfully determining a resource in the time and frequency domains, transmitting, to the abovementioned another UE, signaling on the resource before the time boundary, wherein the signaling indicates the set of resources.

Some embodiments of the present application provide a method, which may be performed by a UE. The method includes: transmitting, to another UE, coordination information; in response to the abovementioned another UE successfully determining a set of resources in at least one domain of time and frequency domains, receiving, from the abovementioned another UE, signaling before a time boundary, wherein the signaling indicates the set of resources, and wherein the time boundary is determined based on the coordination information; and performing a resource selection procedure by taking the set of resources into account, to select a transmission resource.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement any of the abovementioned method performed by a UE.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only exemplary embodiments of the present application and are not therefore intended to limit the scope of the present application.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8, B5G, 6G, and so on. It is contemplated that along with developments of network architectures and new service scenarios, all embodiments in the present application are also applicable to similar technical problems; and moreover, the terminologies recited in the present application may change, which should not affect the principle of the present application.

In a V2X communication system, a transmission UE may also be named as a transmitting UE, a Tx UE, a sidelink Tx UE, a sidelink transmission UE, or the like. A reception UE may also be named as a receiving UE, a Rx UE, a sidelink Rx UE, a sidelink reception UE, or the like.

Figure 1:
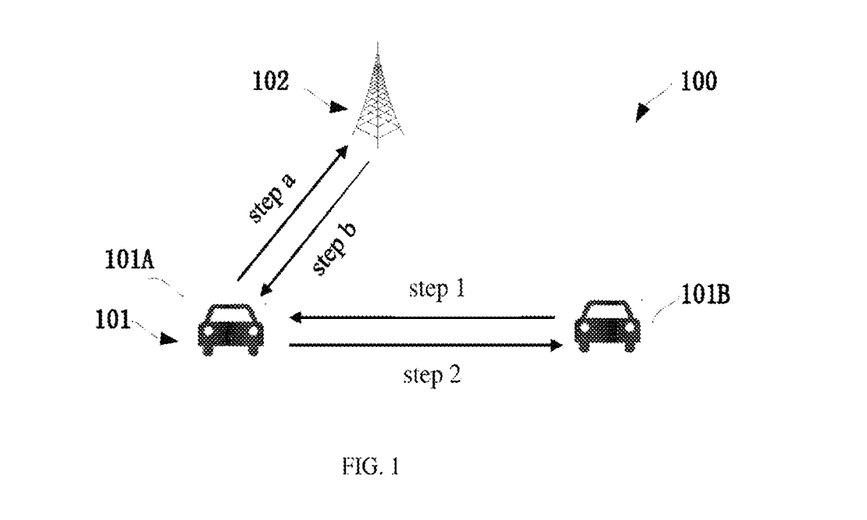
FIG. 1 illustrates an exemplary V2X communication system in accordance with some embodiments of the present application.

FIG. 1 illustrates an exemplary V2X communication system in accordance with some embodiments of the present application.

As shown in FIG. 1, a wireless communication system 100 includes at least two user equipments (UEs) 101, including UE 101A and UE 101B, and at least one base station (BS) 102 for illustrative purpose. Although a specific number of UE 101 and BS 102 are depicted in FIG. 1, it is contemplated that any number of UEs 101 and BS 102 may be included in the wireless communication system 100.

Each UE in FIG. 1 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, a UE in FIG. 1 may include a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, a UE in FIG. 1 is a pedestrian UE (P-UE or PUE) or a cyclist UE. In some embodiments of the present application, a UE in FIG. 1 includes wearable devices, such as smart watches, fitness bands, optical head-mounted displays, or the like. Moreover, a UE in FIG. 1 may be referred to as a subscriber unit, a mobile, a mobile station, a user, a terminal, a mobile terminal, a wireless terminal, a fixed terminal, a subscriber station, a user terminal, or a device, or described using other terminology used in the art. A UE in FIG. 1 may communicate directly with a BS via LTE or NR Uu interface. For example, UE 101A may communicate directly with BS 102 via "step a" and "step b" as shown in FIG. 1.

In some embodiments of the present application, each UE in FIG. 1 may be deployed an IoT application, an enhanced mobile broadband (eMBB) application and/or an ultra-reliable and low latency communication (URLLC) application. For instance, UE 101A may implement an IoT application and may be named as an IoT UE, while UE 101B may implement an eMBB application and/or a URLLC application and may be named as an eMBB UE, an URLLC UE, or an eMBB/URLLC UE. It is contemplated that the specific type of application(s) deployed in the UE in FIG. 1 may be varied and not limited.

According to some embodiments of FIG. 1, a UE may exchange V2X messages with another UE(s) through a sidelink, for example, PC5 interface as defined in 3GPP TS 23.303. The UE may transmit information or data to another UE(s) within the V2X communication system, through sidelink unicast, sidelink groupcast, or sidelink broadcast.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) (not shown in FIG. 1) transmit data using an OFDM modulation scheme on the downlink (DL) and the UE(s) in FIG. 1 transmit data on the uplink (UL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

Currently, two sidelink resource allocation modes are supported, i.e., Mode 1 and Mode 2. In Mode 1, the sidelink resource in time and frequency domains allocation is provided by a network or a BS. In Mode 2, a UE decides the SL transmission resources in time and frequency domains in a resource pool.

According to agreements of 3GPP standard documents, in a 3GPP 5G NR sidelink system or the like, inter-UE coordination can be used to enhance the reliability of a sidelink transmission. The definition of inter-UE coordination is that a set of resources is determined at a coordination UE (e.g., UE 101A as illustrated and shown in FIG. 1). This set of resources may be sent to a Tx UE in Mode 2 (e.g., UE 101B as illustrated and shown in FIG. 1), and the Tx UE in Mode 2 may take this set of resources into account during a resource selection procedure for its own transmission. At the side of the Tx UE in Mode 2, there may be "one or multiple sessions" or "one or more multiple transmissions" towards different Rx UE(s) or different destinations.

Referring back to FIG. 1, in particular, in step 1 as shown in FIG. 1, UE 101B (which may function as a Tx UE) transmits trigger information or coordination information to UE 101A (which may function as a coordination UE). UE 101A may work with sidelink resource allocation Mode 1 or Mode 2. A candidate receiver may also be named as an intended receiver, a targeted receiver, a candidate receiving UE, a candidate Rx UE, or the like. In step 2 as shown in FIG. 1, UE 101A transmits information regarding a set of resources in time domain and/or frequency domain to UE 101B.

Embodiments of the present application define specific procedures of how to guarantee that UE 101A can transmit a set of resources in time domain and/or frequency domain to UE 101B in time, how to align the set of resources with the resource selection window of UE 101B which works with resource allocation Mode 2, how to guarantee that a BS can allocate sidelink resource(s) in time for the transmission of a set of resources if UE 101A works with resource allocation Mode 1, and how to handle periodic traffic for inter-UE coordination. The embodiments of the present application will be specifically described below.

Figure 2:
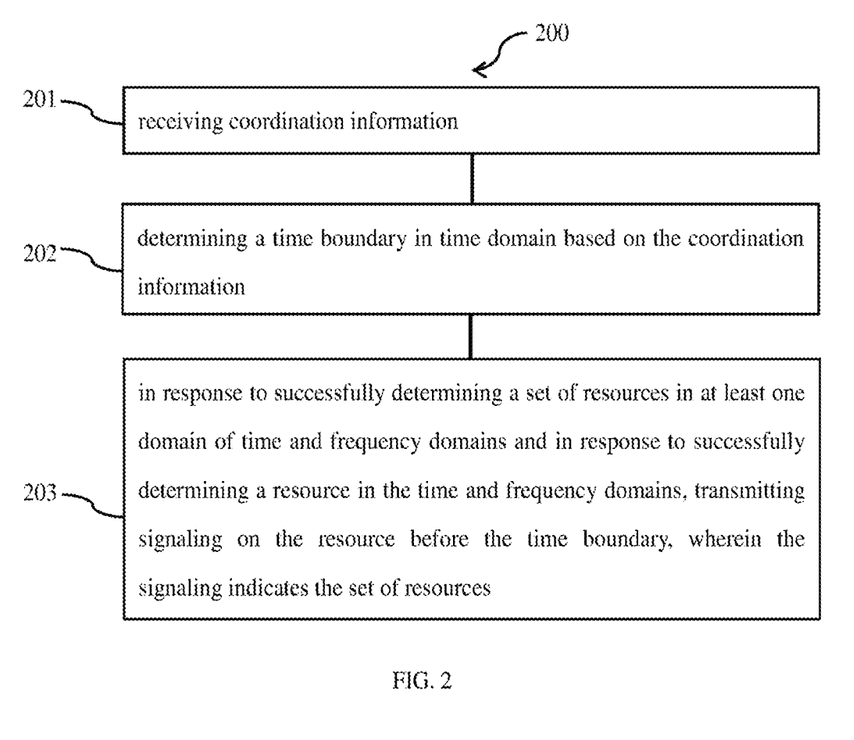
FIG. 2 illustrates an exemplary flow chart of a method for receiving coordination information according to some embodiments of the present application.

FIG. 2 illustrates an exemplary flow chart of a method for receiving coordination information according to some embodiments of the present application.

Figure 3:
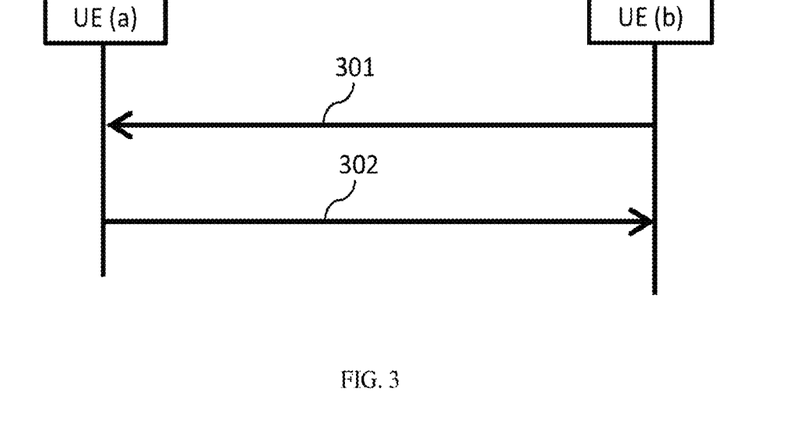
FIG. 3 illustrates an exemplary diagram of indicating a set of resources according to some embodiments of the present application.
Figure 7:
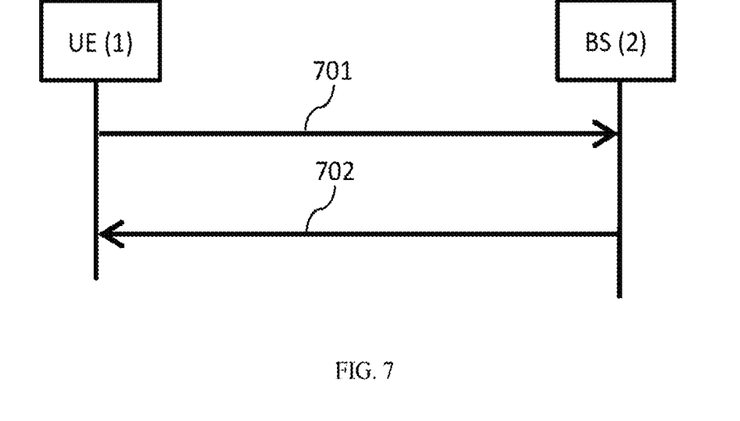
FIG. 7 illustrates an exemplary flow chart of requesting a resource according to some embodiments of the present application.

The embodiments of FIG. 2 may be performed by a UE (e.g., UE 101A illustrated and shown in FIG. 1, UE (a) illustrated and shown in FIG. 3, or UE (1) illustrated and shown in FIG. 7). Although described with respect to a UE, it should be understood that other devices may be configured to perform a method similar to that of FIG. 2.

In the exemplary method 200 as shown in FIG. 2, in operation 201, a UE (e.g., UE 101A illustrated and shown in FIG. 1, UE (a) illustrated and shown in FIG. 3, or UE (1) illustrated and shown in FIG. 7) receives coordination information. For example, the UE receives coordination information from another UE (e.g., UE 101B illustrated and shown in FIG. 1 or UE (b) illustrated and shown in FIG. 3).

The embodiments of FIG. 2 assume that the abovementioned another UE (e.g., UE 101B illustrated and shown in FIG. 1) works in Mode 2. That is to say, a sidelink resource in the time domain and/or frequency domain for a sidelink transmission of the abovementioned another UE is decided by the UE (e.g., UE 101A illustrated and shown in FIG. 1). In the embodiments of FIG. 2, the UE functions as a coordination UE and the abovementioned another UE functions as a Tx UE.

In operation 202, the UE determines a time boundary in time domain based on the coordination information received in operation 201. In operation 203, if the UE successfully determines a set of resources in time domain and/or frequency domain and if the UE successfully determines resource(s) in the time and frequency domains, the UE transmits signaling on the resource(s) before the time boundary. The signaling indicates the set of resources in time domain and/or frequency domain.

According to some embodiments, the coordination information received in operation 201 includes a time offset value. The time boundary is determined in operation 202 by calculating a sum of the time offset value and a time instance of receiving the coordination information in operation 201. For example, the time offset value may be in a millisecond (e.g., 10 ms). The time offset value may be represented by a total number of physical slot(s) or a total number of logical slot(s).

According to some other embodiments, the coordination information received in operation 201 includes a time instance in time domain. The time boundary corresponds to the time instance. In one example, the time instance is associated with a system frame number (SFN) and a slot index. For instance, the coordination information received in operation 201 includes an absolute time in time domain, which may be represented by a sum of a SFN and a slot index value.

In the embodiments of FIG. 2, the UE may work with Mode 1 or Mode 2. According to some embodiments, if the UE has available data to be transmitted to the abovementioned another UE, the UE transmits the available data and the signaling together on the determined resource(s). In particular, with reference to FIG. 1, if UE 101A works with resource allocation Mode 1, physical resource(s) for transmission of signaling (which indicates the set of resources) should be allocated by a BS. If UE 101A also has data to be transmitted to UE 101B, the BS may allocate sidelink resource(s) to UE 101A for its data transmission. UE 101A can transmit the data and the signaling (which indicates the set of resources) together on the resource(s) allocated by the BS.

According to an embodiment, the UE transmits, to a network or a base station (BS) (e.g., BS 102 illustrated and shown in FIG. 1 or BS (2) illustrated and shown in FIG. 7), a request via a dedicated scheduling request (SR) resource. Then, the network or the BS allocates resource(s), which may be used to transmit signaling that indicates the set of resources before the time boundary. The UE receives, from the network or the base station, configuration information or signaling which indicates the resource(s) allocated by the BS. The UE may determine the allocated resource(s) based on the received configuration information or signaling. In particular, with reference to FIG. 1, if UE 101A works with resource allocation Mode 1 and if data to be transmitted from UE 101A to UE 101B has a low priority, the data to be transmitted may be not timely for a transmission of signaling (which indicates a set of resources), and thus the data to be transmitted and the signaling (which indicates the set of resources) cannot be transmitted together on a sidelink resource allocated by the BS. Furthermore, if UE 101A has no data to be transmitted to UE 101B, the BS will not allocate the sidelink resource. Under this case, the UE may transmit a request via a dedicated SR resource, to request resource(s) for the transmission of the signaling which indicates the set of resources. Such embodiments guarantee that UE 101A can transmit signaling which indicates the set of resources to UE 101B in time, since the BS configures dedicated resource(s) to UE 101A for the transmission of the signaling. A specific example is described in FIG. 7.

According to some embodiments, the set of resources in operation 203 is located in a window in time domain. In one embodiment, a start time instance of the window is the time boundary determined based on the coordination information received in operation 201. Specific examples are described in FIGS. 5 and 6.

(1) In one embodiment, a length of the window in time domain is a fixed value, for example, a fixed value as specified in a standard document.

(2) In a further embodiment, the length of the window in time domain is configured or pre-configured per a resource pool. For instance, the length of the window in time domain may be represented by a total number of slots in time domain, e.g., an exact number of slots in time domain.

(3) In another embodiment, the length of the window in time domain is indicated by the abovementioned another UE (e.g., UE 101B illustrated and shown in FIG. 1). The length of the window in time domain may be associated with a resource selection window of the abovementioned another UE. The resource selection window may be determined by the remaining packet delay budget (PDB) of transmission of the abovementioned another UE.

For instance, with reference to FIG. 1, the coordination information received from UE 101B includes the length of the window in time domain. The length of the set of resources depends on the resource selection window of UE 101B, and the resource selection window is determined by the remaining PDB of UE 101B's transmission. This embodiment is good for performance of UE 101B's transmission and also good for reducing signaling overhead of the set of resources.

Referring back to the embodiments of FIG. 2, if the UE unsuccessfully determines the set of resources, the UE may transmit a message to the abovementioned another UE (e.g., UE 101B illustrated and shown in FIG. 1), to indicate that the set of resources is unsuccessfully determined. The message may also be named as a decline message or the like.

According to some embodiments, the coordination information received in operation 201 includes at least one of:

a period length in time domain of periodic traffic of the abovementioned another UE (e.g., UE 101B illustrated and shown in FIG. 1); and total times of transmitting signaling for indicating one or more sets of resources for the periodic traffic. With reference to FIG. 1, if UE 101A determines four sets of resources for UE 101B's periodic traffic, UE 101A needs to transmit signaling for indicating these four sets of resources four times. UE 101B may transmit an indication related to "four times" in the coordination information.

Figure 6:
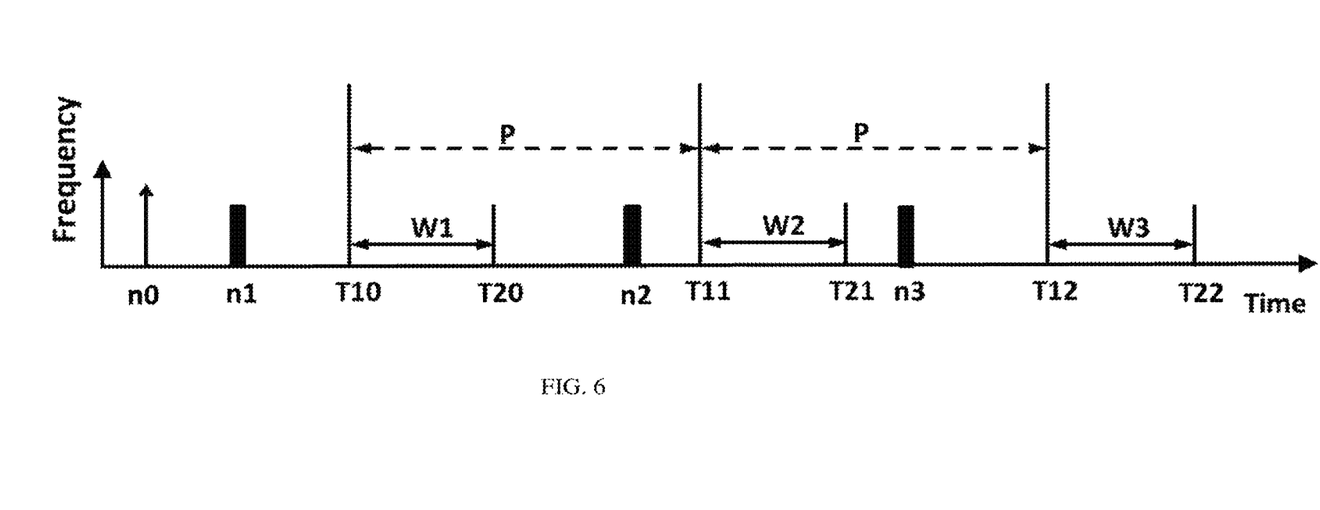
FIG. 6 illustrates a further exemplary diagram of indicating a set of resources before a time boundary according to some embodiments of the present application.

For instance, the period length of UE 101B's periodic traffic is represented as "P" as shown in FIG. 6. UE 101A should transmit a set of resources to UE 101B for each period of 101B's periodic traffic. Furthermore, UE 101B may indicate the requested number of "set of resources" for its periodic traffic in the coordination information received in operation 201. The requested number of "set of resources" for its periodic traffic corresponds to total times of transmitting signaling (which indicates one or more sets of resources) for the periodic traffic. For example, the requested number of "set of resources" is four. Then, UE 101A determines four sets of resources for UE 101B's periodic traffic and transmits signaling for indicating these four sets of resources four times.

Referring back to the embodiments of FIG. 2, if the coordination information includes a period length in time domain (e.g., "P" as shown in FIG. 6) of periodic traffic of the abovementioned another UE, the UE determines a further time boundary in time domain based on the time boundary (which is determined based on the coordination information) and the periodic length. If the UE successfully determines a further set of resources in time domain and/or frequency domain and if the UE successfully determines a further resource in the time and frequency domains, the UE may transmit a further signaling on the further resource before the further time boundary, to indicate the further set of resources to the abovementioned another UE.

For the abovementioned another UE's periodic traffic, the UE may determine another time boundary in time domain based on the time boundary (which is determined based on the coordination information) and the periodic length (e.g., "P" as shown in FIG. 6). If the UE successfully determines another set of resources in time domain and/or frequency domain and if the UE successfully determines another resource in the time and frequency domains, the UE may transmit another signaling on the determined another resource before the determined another time boundary, to indicate the determined another set of resources to the abovementioned another UE. A specific example is described in FIG. 6.

Details described in the embodiments as illustrated and shown in FIGS. 1 and 3-8, especially, contents related to indicating a set of resources in time domain and/or frequency domain, are applicable for the embodiments as illustrated and shown in FIG. 2. Moreover, details described in the embodiments of FIG. 2 are applicable for all the embodiments of FIGS. 1 and 3-8.

FIG. 3 illustrates an exemplary diagram of indicating a set of resources according to some embodiments of the present application.

The embodiments of FIG. 3 assume that UE (a) (e.g., UE 101A illustrated and shown in FIG. 1) functions as a coordination UE, and UE (b) (e.g., UE 101B illustrated and shown in FIG. 1) works in Mode 2 and functions as a Tx UE.

According to some embodiments, as shown in FIG. 3, in step 301, UE (b), which functions as a Tx UE, transmits coordination information to UE (a), which functions as a coordination UE. UE (a) may determine a time boundary in time domain based on the received coordination information. UE (a) may also determine a set of resources according to the received coordination information. In step 302, UE (a) may transmit, to UE (b), signaling which indicates the set of resources on the resource before the time boundary.

Details described in the embodiments as illustrated and shown in FIGS. 1, 2, and 4-8, especially, contents related to indicating a set of resources in time domain and/or frequency domain, are applicable for the embodiments as illustrated and shown in FIG. 3. Moreover, details described in the embodiments of FIG. 3 are applicable for all the embodiments of FIGS. 1, 2, and 4-8.

Figure 4:
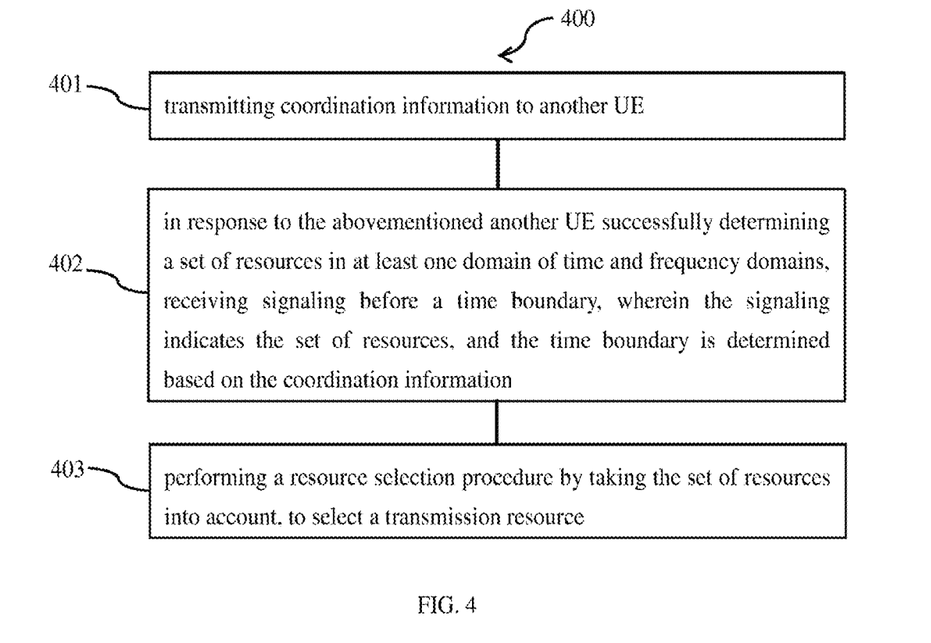
FIG. 4 illustrates an exemplary flow chart of a method for transmitting coordination information according to some embodiments of the present application.

FIG. 4 illustrates an exemplary flow chart of a method for transmitting coordination information according to some embodiments of the present application.

The embodiments of FIG. 4 may be performed by a UE (e.g., UE 101B illustrated and shown in FIG. 1 or UE (b) illustrated and shown in FIG. 3). Although described with respect to a UE, it should be understood that other devices may be configured to perform a method similar to that of FIG. 4.

In the exemplary method 400 as shown in FIG. 4, in operation 401, a UE (e.g., UE 101B illustrated and shown in FIG. 1 or UE (b) illustrated and shown in FIG. 3) transmits coordination information to another UE (e.g., UE 101A illustrated and shown in FIG. 1, UE (a) illustrated and shown in FIG. 3, or UE (1) illustrated and shown in FIG. 7).

The embodiments of FIG. 4 assume that the UE (e.g., UE 101B illustrated and shown in FIG. 1) works in Mode 2. That is to say, a sidelink resource in the time domain and/or frequency domain for a sidelink transmission of the UE is decided by the abovementioned another UE. In the embodiments of FIG. 4, the UE functions as a Tx UE, and the abovementioned another UE functions as a coordination UE.

In operation 402, if the abovementioned another UE successfully determines a set of resources in time domain and/or frequency domain, the UE receives signaling before a time boundary. The signaling indicates the set of resources. The time boundary is determined based on the coordination information transmitted in operation 401. In operation 403, the UE performs a resource selection procedure by taking the set of resources indicated by the signaling into account, to select a transmission resource. The UE may transmit data on the selected transmission resource.

According to some embodiments, if the abovementioned another UE (e.g., UE 101A illustrated and shown in FIG. 1) has available data to be transmitted to the UE (e.g., UE 101B illustrated and shown in FIG. 1), the UE may receive the available data and the signaling together on the resource. If the abovementioned another UE unsuccessfully determines the set of resources, the UE may receive, from the abovementioned another UE, a message which indicates that the set of resources is unsuccessfully determined. The message may also be named as a decline message or the like.

According to some embodiments, if the UE does not receive any signaling indicating a set of resource before the time boundary or if the UE receives a message which indicates that the set of resources is unsuccessfully determined by the abovementioned UE, the UE may select a transmission resource from a candidate resource set determined by the sensing procedure of the UE, without taking the set of resources into account.

With reference to FIG. 1, in a case that UE 101A fails to get a resource to transmit signaling (which indicates the set of resources) in time, UE 101B cannot receive any signaling indicating a set of resource before the time boundary, and thus, UE 101B may fallback to select resource(s) from its own candidate resource set determined by the sensing procedure of the UE. In a case that UE 101A cannot determine a set of resources, UE 101A may transmit a decline message to UE 101B. In a case that UE 101A cannot get the set of resources based on its sensing, then, UE 101A may transmit a decline message, instead of the set of resources to UE 101B. After receiving a decline message from UE 101A, UE 101B may fallback to select resource(s) from its own candidate resource set determined by the sensing procedure of the UE, without taking the set of resources into account.

According to some embodiments, the coordination information transmitted in operation 401 includes a time offset value. The time boundary is determined as a sum of the time offset value and a time instance of transmitting the coordination information in operation 401. The time offset value may be in a millisecond (e.g., The time offset value may be represented by a total number of physical slot(s) or a total number of logical slot(s).

According to some other embodiments, the coordination information transmitted in operation 401 includes a time instance in time domain. The time boundary corresponds to the time instance. In one example, the time instance is associated with a system frame number (SFN) and a slot index. For instance, the coordination information includes an absolute time in time domain, which is represented by a sum of a SFN and a slot index value.

According to some embodiments, the set of resources indicated by the signaling in operation 402 is located in a window in time domain. In one embodiment, a start time instance of the window is the time boundary determined based on the coordination information transmitted in operation 401. A specific example is described in FIG. 5.

The length of the window in time domain may be represented by a total number of slots in time domain, e.g., an exact number of slots in time domain. The length of the window in time domain may be associated with a resource selection window of the UE (e.g., UE 101B illustrated and shown in FIG. 1). In one embodiment, a length of the window in time domain is a fixed value, for example, a fixed value as specified in a standard document. In a further embodiment, the length of the window in time domain is configured or pre-configured per a resource pool.

In another embodiment, the length of the window in time domain is indicated by the UE. For instance, with reference to FIG. 1, the coordination information received from UE 101B includes the length of the window in time domain. In this embodiment, the length of the set of resources should depend on the resource selection window of UE 101B, and the resource selection window is determined by the remaining PDB of UE 101B's transmission. This embodiment is good for performance of UE 101B's transmission and also good for reducing a signaling overhead of the set of resources.

According to some embodiments, the coordination information transmitted in operation 401 includes at least one of:
- a period length in time domain (e.g., "P" as shown in FIG. 6) of periodic traffic of the UE (e.g., UE 101B illustrated and shown in FIG. 1); and
- total times of transmitting signaling for indicating one or more sets of resources for the periodic traffic. For instance, the coordination information transmitted by UE 101B includes the requested number of "set of resources" for UE 101B's periodic traffic.

In an example, UE 101B may indicate the period length of its traffic based on the configured parameter 'sl-ResourceReservePeriodList-r16', e.g., the index of the period of its traffic in the following configured list as specified in 3GPP standard document TS38.331.

Referring back to the embodiments of FIG. 4, if the coordination information transmitted in operation 401 includes a period length in time domain of periodic traffic of the UE and if the abovementioned another UE successfully determines a further set of resources in time domain and/or frequency domain, the UE may receive, from the abovementioned another UE, a further signaling before a further time boundary in time domain, which indicates the further set of resource. The further time boundary may be determined based on the time boundary (which is determined based on the coordination information) and the periodic length in time domain of the UE's periodic traffic. The UE may perform the resource selection procedure by taking the further set of resources into account, to select a further transmission resource.

For the UE's periodic traffic, if the abovementioned another UE successfully determines another set of resources in time domain and/or frequency domain, the UE may receive, from the abovementioned another UE, another signaling before another time boundary in time domain, which indicates the abovementioned another set of resource. The abovementioned another time boundary may be determined based on the time boundary (which is determined based on the coordination information) and the periodic length in time domain of the UE's periodic traffic. The UE may perform the resource selection procedure by taking the abovementioned another set of resources into account, to select another transmission resource. A specific example is described in FIG. 6.

Details described in the embodiments as illustrated and shown in FIGS. 1-3 and 5-8, especially, contents related to receiving signaling indicating a set of resources in time domain and/or frequency domain, are applicable for the embodiments as illustrated and shown in FIG. 4. Moreover, details described in the embodiments of FIG. 4 are applicable for all the embodiments of FIGS. 1-3 and 5-8.

Figure 5:
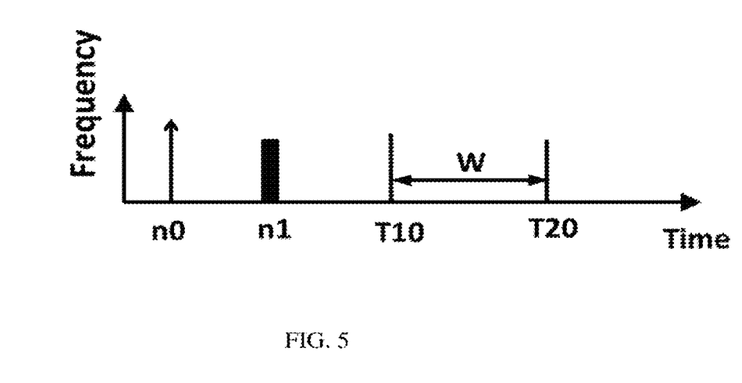
FIG. 5 illustrates an exemplary diagram of indicating a set of resources before a time boundary according to some embodiments of the present application.

FIG. 5 illustrates an exemplary diagram of indicating a set of resources before a time boundary according to some embodiments of the present application. The embodiments of FIG. 5 show a flow chart in time domain performed by UE-A (e.g., UE 101A illustrated and shown in FIG. 1, UE (a) illustrated and shown in FIG. 3, or UE (1) illustrated and shown in FIG. 7) and UE-B (e.g., UE 101B illustrated and shown in FIG. 1 or UE (b) illustrated and shown in FIG. 3).

In the embodiments of FIG. 5, at time instance "n0", UE-B (e.g., UE 101B illustrated and shown in FIG. 1) transmits coordination information to UE-A (e.g., UE 101A illustrated and shown in FIG. 1). The coordination information may contain a time boundary for transmission of a set of resources. For example, the time boundary is the same as time instance "T10" as shown in FIG. 5.

Then, UE-A determines a set of resources in time domain and/or frequency domain and determines a resource in the time and frequency domains. After UE-A successfully determines the set of resources and successfully determines the resource, UE-A may transmit signaling (which indicates the set of resources) on a resource at any time instance before

```
sl-ResourceReservePeriodList-r16      SEQUENCE (SIZE (1..16)) OF
SL-ResourceReservePeriod-r16          OPTIONAL, -- Need M
SL-ResourceReservePeriod-r16 ::=      CHOICE{
    sl-ResourceReservePeriod1-r16         ENUMERATED {ms0, ms100,
    ms200, ms300, ms400, ms500, ms600, ms700, ms800, ms900, ms1000},
    sl-ResourceReservePeriod2-r16         INTEGER (1..99)
}
``` the time boundary "T10". For instance, UE-A transmit the signaling at time instance "n1" as shown in FIG. 5.

A resource window in time domain for UE-B's transmission is marked as "W". The window "W" starts from the time instance "T10" and ends at time instance "T20" as shown in FIG. 5. The set of resources determined by UE-A should be located within the window "W" for UE-B's transmission. After receiving the signaling (which indicates the set of resources) on the resource at time instance "n1", UE-B may perform a resource selection procedure by taking the set of resources determined by UE-A into account, to select a transmission resource. UE-B may transmit data on the selected transmission resource.

Details described in the embodiments as illustrated and shown in FIGS. 1-4 and 6-8, especially, contents related to indicating a set of resources in time domain and/or frequency domain, are applicable for the embodiments as illustrated and shown in FIG. 5. Moreover, details described in the embodiments of FIG. 5 are applicable for all the embodiments of FIGS. 1-4 and 6-8.

FIG. 6 illustrates a further exemplary diagram of indicating a set of resources before a time boundary according to some embodiments of the present application. Similar to FIG. 5, the embodiments of FIG. 6 show a flow chart in time domain performed by UE-A (e.g., UE 101A illustrated and shown in FIG. 1, UE (a) illustrated and shown in FIG. 3, or UE (1) illustrated and shown in FIG. 7) and UE-B (e.g., UE 101B illustrated and shown in FIG. 1 or UE (b) illustrated and shown in FIG. 3).

The embodiments of FIG. 6 assume that UE-B supports periodic traffic. For example, three resource windows in time domain for UE-B's transmissions are marked as "W1," "W2," and "W3" as shown in FIG. 6. Although a specific number of resource windows in time domain are depicted in FIG. 6, it is contemplated that any number of resource windows in time domain may be included for UE-B's transmissions.

The window "W1" starts from the time instance "T10" and ends at time instance "T20". The window "W2" starts from the time instance "T11" and ends at time instance "T21". The window "W3" starts from the time instance "T12" and ends at time instance "T22".

Similar to FIG. 5, in the embodiments of FIG. 6, at time instance "n0", UE-B (e.g., UE 101B illustrated and shown in FIG. 1) transmits coordination information to UE-A (e.g., UE 101A illustrated and shown in FIG. 1). The coordination information may contain a time boundary for transmission of a set of resources. For example, the time boundary is the same as time instance "T10" as shown in FIG. 6.

After UE-A successfully determines a set of resources located within the window "W1" and successfully determines a resource, UE-A transmits signaling (which indicates the set of resources) on the resource before the time boundary "T10". For example, UE-A transmits the signaling on the resource at time instance "n1" as shown in FIG. 6. After UE-B receives the signaling on the resource at time instance "n1", UE-B may perform a resource selection procedure by taking the set of resources determined by UE-A into account, to select a transmission resource.

In the embodiments of FIG. 6, the coordination information may contain both the time boundary (e.g., time instance "T10" as shown in FIG. 6) and a period length in time domain (e.g., "P" as shown in FIG. 6) of UE-B's periodic traffic. UE-A may determine or calculate a second time boundary for transmitting further signaling to indicate a further set of resources in a subsequent resource window. In the embodiments of FIG. 6, the coordination information may further contain the requested number of "set of resources" for UE-B's periodic traffic. For instance, in the embodiments of FIG. 6, the requested number of "set of resources" is three.

In an example, based on the time boundary (i.e., time instance "T10") and period length "P", UE-A may calculate a sum of time instance "T10" and period length "P" and determine that a second time boundary for transmitting further signaling (which indicates a further set of resources located in window "W2") is time instance "T11" as shown in FIG. 6. That is, time instance "T11" is the second time boundary.

After UE-A successfully determines the further set of resources located within the window "W2" and successfully determines a further resource, UE-A may transmit the further signaling on the further resource at any time instance before the second time boundary "T11". For example, UE-A transmits the further signaling on the further resource at time instance "n2" as shown in FIG. 6.

After receiving the further signaling at time instance "n2", UE-B may perform a resource selection procedure by taking the further set of resources located in window "W2" into account, to select a further transmission resource.

Similarly, UE-A may calculate a sum of the second time boundary (i.e., time instance "T11") and period length "P" and determine that a third time boundary for transmitting another signaling (which indicates another set of resources located in window "W3") is time instance "T12" as shown in FIG. 6. That is, time instance "T12" is the third time boundary.

After UE-A successfully determines the abovementioned another set of resources located within the window "W3" and successfully determines another resource, UE-A may transmit the abovementioned another signaling on the abovementioned another resource at any time instance before the third time boundary "T12". For example, UE-A transmits the abovementioned another signaling on the abovementioned another resource at time instance "n3" as shown in FIG. 6.

After receiving the abovementioned another signaling at time instance "n3", UE-B may perform a resource selection procedure by taking the abovementioned another set of resources located in window "W3" into account, to select another transmission resource.

Details described in the embodiments as illustrated and shown in FIGS. 1-5, 7, and 8, especially, contents related to indicating a set of resources in time domain and/or frequency domain, are applicable for the embodiments as illustrated and shown in FIG. 6. Moreover, details described in the embodiments of FIG. 6 are applicable for all the embodiments of FIGS. 1-5, 7, and 8.

FIG. 7 illustrates an exemplary flow chart of requesting a resource according to some embodiments of the present application.

The embodiments of FIG. 7 assume that UE (1) (e.g., UE 101A illustrated and shown in FIG. 1) functions as a coordination UE, and works with resource allocation Mode 1. Thus, physical resource(s) for UE (1) to transmit a set of resources should be allocated by BS (2) (e.g., BS 102 illustrated and shown in FIG. 1).

In the embodiments as shown in FIG. 7, in step 701, UE (1) transmits a request to BS (2). For example, UE (1) may transmit a request via a dedicated SR resource, to request resource(s) for the transmission of a set of resources in time domain and/or frequency domain.

In step 702, BS (2) transmits, to UE (1), signaling or configuration information which indicates resource(s) allocated by BS (2). Then, UE (1) can transmit signaling, which indicates the set of resources, on the indicated resource(s) to another UE (e.g., UE 101B illustrated and shown in FIG. 1) in time.

Details described in the embodiments as illustrated and shown in FIGS. 1-6 and 8, especially, contents related to indicating a set of resources, are applicable for the embodiments as illustrated and shown in FIG. 7. Moreover, details described in the embodiments of FIG. 7 are applicable for all the embodiments of FIGS. 1-6 and 8.

Figure 8:
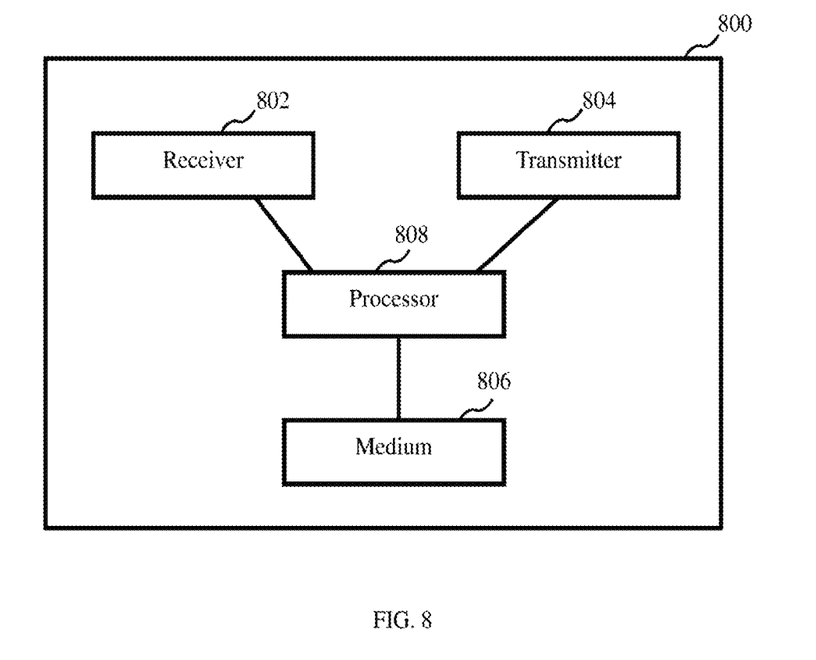
FIG. 8 illustrates an exemplary block diagram of an apparatus according to some embodiments of the present application.

FIG. 8 illustrates an exemplary block diagram of an apparatus according to some embodiments of the present application. In some embodiments of the present application, the apparatus 800 may be a UE, which can at least perform the method illustrated in any one of FIGS. 2-7.

As shown in FIG. 8, the apparatus 800 may include at least one receiver 802, at least one transmitter 804, at least one non-transitory computer-readable medium 806, and at least one processor 808 coupled to the at least one receiver 802, the at least one transmitter 804, and the at least one non-transitory computer-readable medium 806.

Although in FIG. 8, elements such as the at least one receiver 802, the at least one transmitter 804, the at least one non-transitory computer-readable medium 806, and the at least one processor 808 are described in the singular, the plural is contemplated unless limitation to the singular is explicitly stated. In some embodiments of the present application, the at least one receiver 802 and the at least one transmitter 804 are combined into a single device, such as a transceiver. In certain embodiments of the present application, the apparatus 800 may further include an input device, a memory, and/or other components.

In some embodiments of the present application, the at least one non-transitory computer-readable medium 806 may have stored thereon computer-executable instructions which are programmed to implement the operations of the methods, for example as described in view of any of FIGS. 2-7, with the at least one receiver 802, the at least one transmitter 804, and the at least one processor 808.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A method performed by a first user equipment (UE), the method comprising:
receiving coordination information from a second UE;
determining a time boundary in a time domain based on the coordination information;
determining a set of resources in at least the time domain based on the time boundary, wherein the set of resources comprises candidate resources for sidelink communication;
determining a resource in the time domain and a frequency domain, wherein the resource is for transmitting signaling indicating the set of resources and is before the time boundary; and
transmitting, to the second UE, the signaling indicating the set of resources on the resource.

2. The method of claim 1, wherein the set of resources is located in a window in the time domain.

3. The method of claim 2, wherein a start time instance of the window is the time boundary.

4. The method of claim 2, wherein a length of the window is:
a fixed value;
configured or pre-configured per a resource pool; or
indicated by the second UE.

5. The method of claim 1, wherein the coordination information includes at least one of:
a period length in the time domain of periodic traffic of the second UE; or
total times of transmitting signaling for indicating one or more sets of resources for the periodic traffic.

6. The method of claim 5, further comprising, in response to the coordination information including the period length:
determining a second time boundary in the time domain based on the time boundary and the period length; and
in response to successfully determining a second set of resources in at least one of the time domain or the frequency domain and in response to successfully determining a second resource in the time domain and the frequency domain, transmitting, to the second UE, second signaling on the second resource before the second time boundary, wherein the second signaling indicates the second set of resources.

7. The method of claim 1, further comprising:
transmitting, to a network or a base station (BS), a request via a dedicated scheduling request (SR) resource; and
receiving, from the network or the base station, signaling indicating the resource.

8. A first user equipment (UE) for wireless communication, comprising:
  at least one memory; and
  at least one processor coupled with the at least one memory and configured to cause the first UE to:
    transmit, to a second UE, coordination information;
    in response to the second UE determining a set of resources in at least a time domain and a resource in the time domain and a frequency domain, receive, from the second UE and on the resource, signaling indicating the set of resources, wherein a time boundary is determined based on the coordination information, the set of resources comprises candidate resources for sidelink communication, and the resource is before the time boundary; and
  perform a resource selection procedure by taking the set of resources into account to select a transmission resource.

9. The first UE of claim 8, wherein the set of resources is located in a window in the time domain.

10. The first UE of claim 9, wherein a start time instance of the window is the time boundary.

11. The first UE of claim 9, wherein a length of the window is:
  a fixed value;
  configured or pre-configured per a resource pool; or
  indicated by the first UE.

12. The first UE of claim 8, wherein the coordination information includes at least one of:
  a period length in the time domain of periodic traffic of the first UE; or
  total times of receiving signaling for indicating one or more sets of resources for the periodic traffic.

13. A first user equipment (UE) for wireless communication, comprising:
  at least one memory; and
  at least one processor coupled with the at least one memory and configured to cause the first UE to:
    receive coordination information from a user equipment (UE) second UE;
    determine a time boundary in a time domain based on the coordination information;
    determine a set of resources in at least the time domain based on the time boundary, wherein the set of resources comprises candidate resources for sidelink communication;
    determine a resource in the time domain and a frequency domain, wherein the resource is for transmitting signaling indicating the set of resources and is before the time boundary; and
    transmit, to the second UE, the signaling indicating the set of resources on the resource.

14. The first UE of claim 13, wherein the set of resources is located in a window in the time domain.

15. The first UE of claim 14, wherein a start time instance of the window is the time boundary.

16. The first UE of claim 14, wherein a length of the window is:
  a fixed value;
  configured or pre-configured per a resource pool; or
  indicated by the second UE.

17. The first UE of claim 13, wherein the coordination information includes at least one of:
  a period length in the time domain of periodic traffic of the second UE; or
  total times of transmitting signaling for indicating one or more sets of resources for the periodic traffic.

18. The first UE of claim 17, wherein the at least one processor is further configured to cause the first UE to:
  determine a second time boundary in the time domain based on the time boundary and the period length; and
  in response to successfully determining a second set of resources in at least one of the time domain or the frequency domain and in response to successfully determining a second resource in the time domain and the frequency domain, transmit, to the second UE, second signaling on the second resource before the second time boundary, wherein the second signaling indicates the second set of resources.

19. The first UE of claim 13, wherein the at least one processor is further configured to cause the first UE to:
  transmit, to a network or a base station (BS), a request via a dedicated scheduling request (SR) resource; and
  receive, from the network or the base station, signaling indicating the resource.

20. A method performed by a first user equipment (UE), the method comprising:
  transmitting, to a second UE, coordination information;
  in response to the second UE determining a set of resources in at least a time domain and a resource in the time domain and a frequency domain, receiving, from the second UE and on the resource, signaling indicating the set of resources, wherein a time boundary is determined based on the coordination information, the set of resources comprises candidate resources for sidelink communication, and the resource is before the time boundary; and
  performing a resource selection procedure by taking the set of resources into account to select a transmission resource.

* * * * *